May 15, 1951 W. S. BACHMAN 2,553,290

MAGNETIC RECORDING AND REPRODUCING SYSTEM

Filed Feb. 12, 1947

Inventor:
William S. Bachman,
by Merton D. Morse
His Attorney.

Patented May 15, 1951 2,553,290

UNITED STATES PATENT OFFICE 2,553,290

MAGNETIC RECORDING AND REPRODUCING SYSTEM

William S. Bachman, Fairfield, Conn., assignor to General Electric Company, a corporation of New York Application February 12, 1947, Serial No. 728,036

10 Claims. (Cl. 179—100.2)

This invention concerns magnetic recording and reproducing systems, and more particularly electromagnetic heads for magnetic wire or tape recording and reproducing systems.

It is an object of this invention to provide a magnetic recording and reproducing system wherein separate electromagnetic heads are provided for recording on a magnetic recording medium and for reproduction of the recorded signal.

In prior art devices, attempts have been made to secure maximum recorded signal strength on a magnetic recording medium and to secure maximum utilization of the recorded signal in a single recording and reproducing head, while maintaining a high degree of fidelity.

I have determined, however, that certain parameters of a single head which will result in the optimum recording are inconsistent with optimum reproduction of the recorded signal by the same head.

It is accordingly a more specific object of the present invention to provide a magnetic recording and reproducing system incorporating a recording head which will permit maximum utilization of the magnetic capability of the medium and which will so record the signal as to make possible efficient reproduction with minimum distortion, and a reproducing head so designed and proportioned as most efficiently and with minimum distortion to reproduce the original signal from the medium on which the recording has been imposed.

The novel features which I believe to be characteristic of my invention are set forth with particularity in the appended claims. My invention itself, however, both as to its organization and method of operation, together with further objects and advantages thereof may best be understood by reference to the following description taken in connection with the accompanying drawings, wherein Fig. 1 shows an electromagnetic head of the type adapted for use in my invention, and Fig. 2 shows a complete recording and reproducing system of the type to be described.

Figure 1:
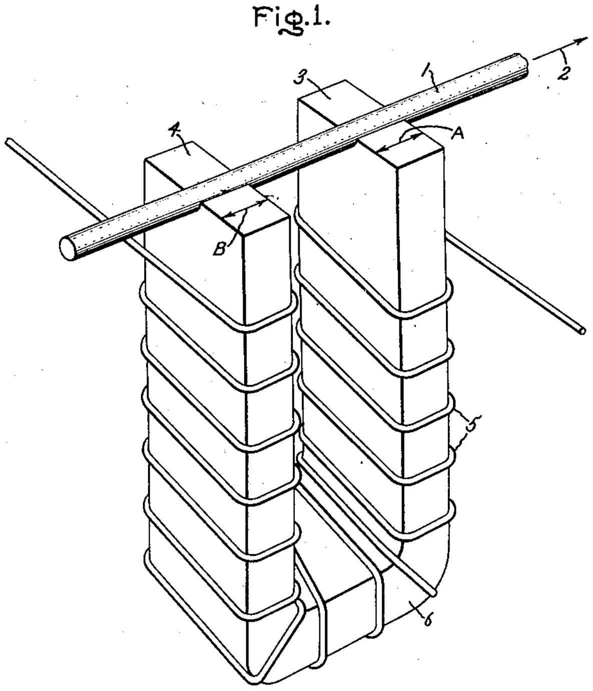
Figure 2:
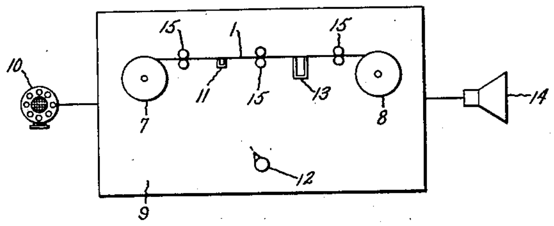

Referring now to Fig. 1 of the drawings, elongated wire 1 represents a magnetic recording medium adapted to be drawn in the direction of arrow 2 across pole faces 3 and 4 of the core of a recording or reproducing electromagnet. The pole faces may be conveniently provided with notches or grooves as shown through which the magnetic recording wire may be drawn. Winding or coil 5 is wound about the U-shaped electromagnet core member 6 of iron or similar paramagnetic material. The core member 6 and coil 5 comprise a unit hereinafter referred to as a recording or reproducing head, which may also include suitable supporting and wire guiding means not shown. The dimensions of the pole faces 3 and 4 in the direction longitudinal with respect to the recording medium are shown on the drawing as A and B, respectively, these dimensions being substantially equal to the distance through which contact exists between the pole faces and the wire, or the distance throughout which the faces and wire are in cooperative relationship, since direct contact may not exist if the wire is covered with a film of oil. As discussed hereinafter, these dimensions are of importance to my invention. Also important is the length of the gap, which may be an air gap, defined by the pole faces.

In order to utilize the medium most effectively, it is desirable that the medium, shown in the drawing as a wire, should be subjected to the same magnetic field intensity at all signal frequencies to be recorded. This may be accomplished by providing a constant current for all frequencies through winding 5 at any predetermined volume level of the signal. This in turn may be accomplished by utilizing a high resistance source for the signal current supplied to the recording head winding. It would be expected that reproduction of a signal thus recorded would provide an output rising linearly in volume with increasing frequency, since the voltage induced in the coils of a pickup head theoretically follows the relationship wherein the induced voltage equals the number of turns in the pickup coil multiplied by the rate of change of flux. In practice, however, with heads designed for both recording and reproducing, this relationship has been found to hold true only at low frequencies, up to that frequency represented by a wave length on the recording medium equal to twice the length A or B of one pole face, dimensions A and B being considered equal. It is accordingly desirable to make the dimensions A and B small in the recording head to permit the relationship to hold up to higher frequencies.

In referring herein to the wave length on the recording medium, it is to be understood that this wave length is the distance along the wire, or tape, representing one cycle of the recorded signal. The wave length will thus be equal to the speed of travel of the medium across the recording head pole faces divided by the frequency of the signal. For example, if the speed of the medium is adjusted to 72 inches per second, it will be found that a 7,200 cycle signal as recorded will have a wave length on the medium of .01 inch.

By constructing the recording electromagnet with each of the pole faces 3 and 4 .005 inch long in the dimensions shown as A and B, respectively, optimum utilization of the wire is obtained, since the recording is such as to permit reproduction up to 7,200 cycles at a volume rising substantially linearly with frequency. If the recording head is so designed as to permit cooperation of each pole face with the recording medium for .005 inch, as described, the air gap between the pole faces 3 and 4, which is bridged by the recording medium, may be fixed at .005 inch, or up to .010 inch.

In the construction of a reproducing head, it has been found desirable to proportion the pole faces to contact the recording medium for a substantially longer distance than in the case of a recording head, although the air gap between the pole pieces should be the same. To utilize the greatest amount of magnetic energy stored in the wire at the lower frequencies, as well as to make frequency discriminatory means in the amplifier connected to the reproducing head unnecessary, it has been found that the pole faces should be as long, in the dimensions A and B, as one-half of the wave length on the medium of the lowest frequency signal which it is desired to reproduce with fidelity.

The optimum utilization of the recording medium thus obtained results from the fact that maximum flux will be induced in the core 6 under these conditions, since at the lowest desired frequency, each pole face at a predetermined instant will be co-extensive with a north or south pole present in the medium. If the pole faces were shorter, the north and south polarized portions representing the signal would not be completely contacted by each pole respectively, and less than the maximum possible flux would be induced in the core.

It has been determined that longitudinal magnetization of a wire medium may be accomplished by a head having only one pole face in contact with the wire rather than the two pole faces normally provided. It is a recording effect of this nature, which is produced by the individual action of each of the pole faces of a double pole face recording head, that is minimized in accordance with this invention by making the recording head pole faces short and the reproducing head pole faces long.

In using a prior art combination recording and reproducing head, wherein the pole faces are each as long as one-half of the wavelength of a signal of an intermediate audio frequency, such as 200 to 500 cycles, rather than the lowest desired frequency, which might be 100 cycles, it has been found upon reproduction that nodes of increased response occur in the reproduction of signals having wavelengths equal to ¾, 1¾, 2¾, et seq., of the pole face length, and that antinodes of decreased response occur for signals having wavelengths equal to 1¼, 2¼, 3¼, et seq., of the pole face length. It is to the elimination of these variations in response at predetermined frequencies that this invention is, in part, directed.

Specifically it has been found that by proportioning the lengths of the pole faces of a recording head so that the lengths are each equal to not more than one-half of the wavelength of the highest frequency signal up to which uniform response is desired optimum utilization of the magnetic capabilities of the recording medium are obtained, while apparently minimizing the described single pole magnetizing effects. It has also been found that to reproduce the signal thus recorded with optimum reproduced signal strength, consistent with undistorted response, the pole faces of the reproducing head should be not substantially less than one-half of the wavelength of the lowest frequency signal down to which uniform response is desired. With dimensions proportioned as described, signals of all frequencies within the desired band of frequencies are reproduced with substantially equal attenuation, or with substantially flat response characteristics. Thus a minimum of low frequency compensation, such as is usually called bass-boost, is required in the reproducing amplifier. In addition, the reproduced signal does not contain peaks and troughs, of high and low intensity response, at frequencies within the desired range, yet overall efficiency is maintained at a high level since the magnetic capabilities of the recording medium are fully utilized.

Referring now to Fig. 2, a complete recording and reproducing system is shown comprising a magnetic wire or tape recording medium 1 arranged for unreeling from a supply spool 7 and rewinding on take-up spool 8, a suitable driving mechanism for spool 8, such as an electric motor, being included in apparatus 9. Also included in apparatus 9 is an amplifier of a thermionic vacuum tube type arranged to provide amplified signal currents from microphone 10 to the coil of recording head 11, constructed as described above, when switch 12 is in a first position. Operation of switch 12 to a second position disconnects the coil of recording coil 11 and connects the coil of reproducing head 13 to the amplifier input and loudspeaker 14 to the amplifier output. Guides 15 are provided to maintain the recording wire in the grooves of the recording and reproducing heads, and to dampen vibrations in the wire arising from the spooling arrangement.

It will be understood that, with the exception of the recording and reproducing heads, the amplifier, switch, spools, guides and other portions of Fig. 2 are of well known type.

Since the recording head constructed in accordance with this invention will be relatively small in size and therefore of low impedance it is conveniently provided with signal currents from an output transformer of the type used with loudspeaker voice coils of low impedance. The reproducing head coil is of relatively high impedance, however, and may be conveniently connected to a high impedance input circuit of the amplifier such as is usually provided for use with a high impedance microphone.

It may be desirable to provide two amplifiers in apparatus 9 to enable simultaneous recording and reproduction, thus permitting loudspeaker 14 to reproduce the signal just after recording. A useful monitoring action may be thus obtained.

While I have shown only certain preferred embodiments of my invention by way of illustration, many modifications will occur to those skilled in the art and I therefore wish to have it understood that I intend, in the appended claims, to cover all such modifications as fall within the true spirit and scope of my invention.

What I claim as new and desire to secure by Letters Patent of the United States is:

1. A system for magnetic wire transducing over a given range of frequencies comprising an electromagnetic recording head with two pole faces defining a recording head gap therebetween, an electromagnetic reproducing head with two pole faces defining therebetween a reproducing head gap equal in length to said recording head gap, the pole faces, of each of said heads, being arranged to be longitudinally displaced along and to contact an elongated recording medium, means for drawing said medium longitudinally across said heads, the length of contact of each pole face of the recording head along the recording medium being approximately equal to the length of one of said gaps, and the length of contact of each pole face of the reproducing head along the recording medium being not less than one-half of the wave length of one recorded cycle of the lowest frequency down to which uniform reproducer response is desired.

2. A system for magnetic wire recording operative throughout a frequency band several octaves in width, said system comprising an electromagnetic recording head with two pole faces defining a recording head gap therebetween, and an electromagnetic reproducing head with two pole faces defining therebetween a reproducing head gap equal in length to said recording head gap, the pole faces of each of said heads being arranged to contact an elongated wire recording medium, means for drawing said wire medium longitudinally across said pole faces, the length of contact of each of said recording head pole faces along the recording medium being substantially equal to the length of one of said gaps, the lengths of each of said gaps being not greater than one-half of the wave length of one recorded cycle of the highest frequency up to which uniform reproducer response is desired and the length of contact of each of said reproducing head pole faces along the recording medium being substantially not less than one-half of the wave length of one recorded cycle of the lowest frequency down to which uniform reproducer response is desired.

3. In a magnetic recording and reproducing system operable over a given range of frequencies, a recording head for longitudinally magnetizing an elongated recording medium in accordance with desired signals, a reproducing head for reproductnig such recorded signals, said recording head having two pole faces, each of said pole faces being arranged during recording to contact said medium for a distance not greater than one-half of the wavelength on the medium of the highest frequency signal desired to be reproduced, said reproducing head having a pair of reproducing pole faces, each of said pair of reproducing pole faces during reproduction being in contact with said medium for a distance not less than one-half of the wavelength on the medium of the lowest frequency signal desired to be reproduced.

4. A magnetic recording and reproducing system comprising an electromagnetic recording signals head for recording over a band of several octaves on a traveling elongated magnetic recording signals medium an electromagnetic reproducing head for reproducing said signals from said medium, each of said heads comprising an exciting winding, a paramagnetic core for each of said windings, each of said cores having two pole faces adapted for cooperation with said medium, each of said recording head pole faces having an effective length along said medium of not greater than one-half of the speed of travel of said medium divided by the highest frequency to be recorded, said recording pole faces defining a gap of operative length along said medium equal to the said length of one of said pole faces, each of said reproducing head pole faces having an effective length along said medium of not less than one-half of the speed of travel of said medium divided by the lowest frequency to be reproduced.

5. A recording and reproducing system comprising an electromagnetic reproducing head for reproducing signals magnetically recorded on a traveling elongated recording medium, an electromagnetic recording head for recording signals on said medium, each of said heads comprising an exciting winding, a respective paramagnetic core for each of said windings, two spaced apart pole faces on each of said cores for cooperation with said medium, each of said reproducing head pole faces having an effective length for contacting said medium not less than one-half of the wave length on said medium of the lowest frequency desired to be reproduced, each of said recording head pole faces having an effective length for contacting said medium not greater than one-half of the wave length on said medium of the highest frequency desired to be recorded.

6. A recording and reproducing system comprising an electromagnetic reproducing head for reproducing magnetically recorded signals over a predetermined range of frequencies from a traveling elongated recording medium; a recording head for magnetically recording signals over said range on said medium, each of said heads comprising an exciting winding, a respective paramagnetic core for each of said windings, two pole faces on each of said cores spaced along the direction of travel of said medium for cooperation with said medium, each of said reproducing head pole faces having an effective length along the direction of said medium travel for contacting said medium not less than one-half of the wave length on said medium of the lowest frequency desired to be reproduced each of said recording head pole faces having an effective line along the direction of said medium travel for contacting said medium not greater than one-half of the wave length on said medium of the highest frequency desired to be recorded, said two pole faces of said reproducing and said recording heads being separated by an effective distance along said medium not greater than one-half of the wave length of the highest frequency desired to be reproduced.

7. In a magnetic recording and reproducing system, an elongated magnetic recording medium, a recording head for magnetizing said medium in accordance with desired signals, a reproducing head for reproducing said signals from said medium, said recording head having two pole faces, each of said faces being arranged during recording to contact said medium for a distance not longer than one-half of the wavelength on the medium of the highest frequency signal desired to be reproduced, said reproducing head having a pair of reproducing pole faces, each of said pair of reproducing pole faces during reproduction being in contact with said medium for a distance not less than one-half of the wavelength on the medium of the lowest frequency signal desired to be reproduced, the respective pole faces of each of said heads being longitudinally displaced along said medium.

8. A magnetic recording and reproducing system operable over a band of frequencies comprising a record medium, a recording head comprising a pair of pole faces separated by a non-magnetic gap, a reproducing head comprising a pair of pole faces separated by a non-magnetic gap, means for providing relative movement between said medium and said pole faces, said recording head pole faces having a dimension in the direction of travel of said medium not greater than one-half a wave length on said medium of the highest frequency to be recorded, said reproducing head pole faces having a dimension in the direction of record travel not less than one-half wave length on said medium of the lowest frequency to be reproduced.

9. A magnetic recording and reproducing system comprising a separate recording and reproducing head for use with an elongated traveling magnetic recording medium, each of said heads comprising a magnetic core member with two spaced apart pole faces defining therebetween a gap adapted to be bridged by said medium, said recording head pole faces each having a length not greater than the length along the medium of one half cycle of the highest frequency desired to be recorded on said medium, each of said reproducing head pole faces having an effective length for contacting said medium of not more than the length on said medium of one half cycle of the lowest frequency desired to be reproduced from said medium.

10. Arrangement according to claim 1 wherein each of said gaps have lengths along the recording medium not greater than a half wave length at the highest frequency to be recorded.

WILLIAM S. BACHMAN.

REFERENCES CITED

The following references are of record in the file of this patent:

UNITED STATES PATENTS

| Number | Name | Date |
|---|---|---|
| 2,092,024 | Rowe | Sept. 7, 1937 |
| 2,272,821 | Roys | Feb. 10, 1942 |
| 2,279,018 | Wolfe | Apr. 7, 1942 |
| 2,300,320 | Swartzel | Oct. 27, 1942 |
| 2,351,003 | Camras | June 13, 1944 |
| 2,360,625 | Walker | Oct. 17, 1944 |
| 2,361,753 | Eilenberger | Oct. 31, 1944 |
| 2,381,463 | Potter | Aug. 7, 1945 |
| 2,416,279 | Begun | Feb. 25, 1947 |
| 2,431,540 | Camras | Nov. 25, 1947 |
| 2,433,207 | Eilenberger | Dec. 23, 1947 |
| 2,469,440 | Roys | May 10, 1949 |

FOREIGN PATENTS

| Number | Country | Date |
|---|---|---|
| 617,796 | Germany | Aug. 28, 1935 |

OTHER REFERENCES

Supersonic Bias for Magnetic Recording, Holms & Clark, Electronics, July 1945, pages 132 and 133.

Barrett & Tweed, "Some Aspects of Magnetic Recording and Its Application to Broadcasting," publication.